United States Patent [19]

Irvin

[11] 4,060,520
[45] Nov. 29, 1977

[54] CONTINUOUS REACTION FOR PREPARATION OF ARYLENE SULFIDE POLYMER

[75] Inventor: Howard B. Irvin, Bartlesville, Okla.

[73] Assignee: Phillips Petroleum Company, Bartlesville, Okla.

[21] Appl. No.: 671,775

[22] Filed: Mar. 30, 1976

[51] Int. Cl.$^2$ ............................................. C08G 75/16
[52] U.S. Cl. ....................................... 260/79.1; 260/79
[58] Field of Search ................................. 260/79, 79.1

[56] References Cited

U.S. PATENT DOCUMENTS

| 3,600,137 | 8/1971 | Girantet et al. ...................... 260/475 |
| 3,884,884 | 5/1975 | Scoggins et al. ..................... 260/79.1 |

*Primary Examiner*—Melvyn I. Marquis

[57] ABSTRACT

A continuous reaction process is provided for producing arylene sulfide polymer in which a dihalo aromatic compound is contacted with a sulfur complex produced by contacting a solution of sodium N-methylamino butyrate, in an organic amide, with a solution of hydrogen sulfide in an organic amide under conditions suitable to produce a particulate polymeric product. In the process of the invention the sulfur complex is contacted with the dihalo aromatic compound in the presence of an organic amide in a series of three reaction vessels in which (1) the temperature of the reaction is held approximately constant and (2) the reaction pressure is reduced seriatiom to provide driving force to carry the reacting mass through the reaction system. The reacting mass is retained in the series of reaction vessels for a time sufficient to carry the polymerization of at least one of the reactants to substantial completion. Substantially all of the water liberated in the reaction is removed as vapor to provide the seriatim pressure reduction. The reaction effluent from the third reaction vessel is subjected to a sufficient reduction of pressure in the presence of superheated steam to flash evaporate the diluent portion of the effluent to produce a particulate solid product and condensible diluent vapor.

6 Claims, 1 Drawing Figure

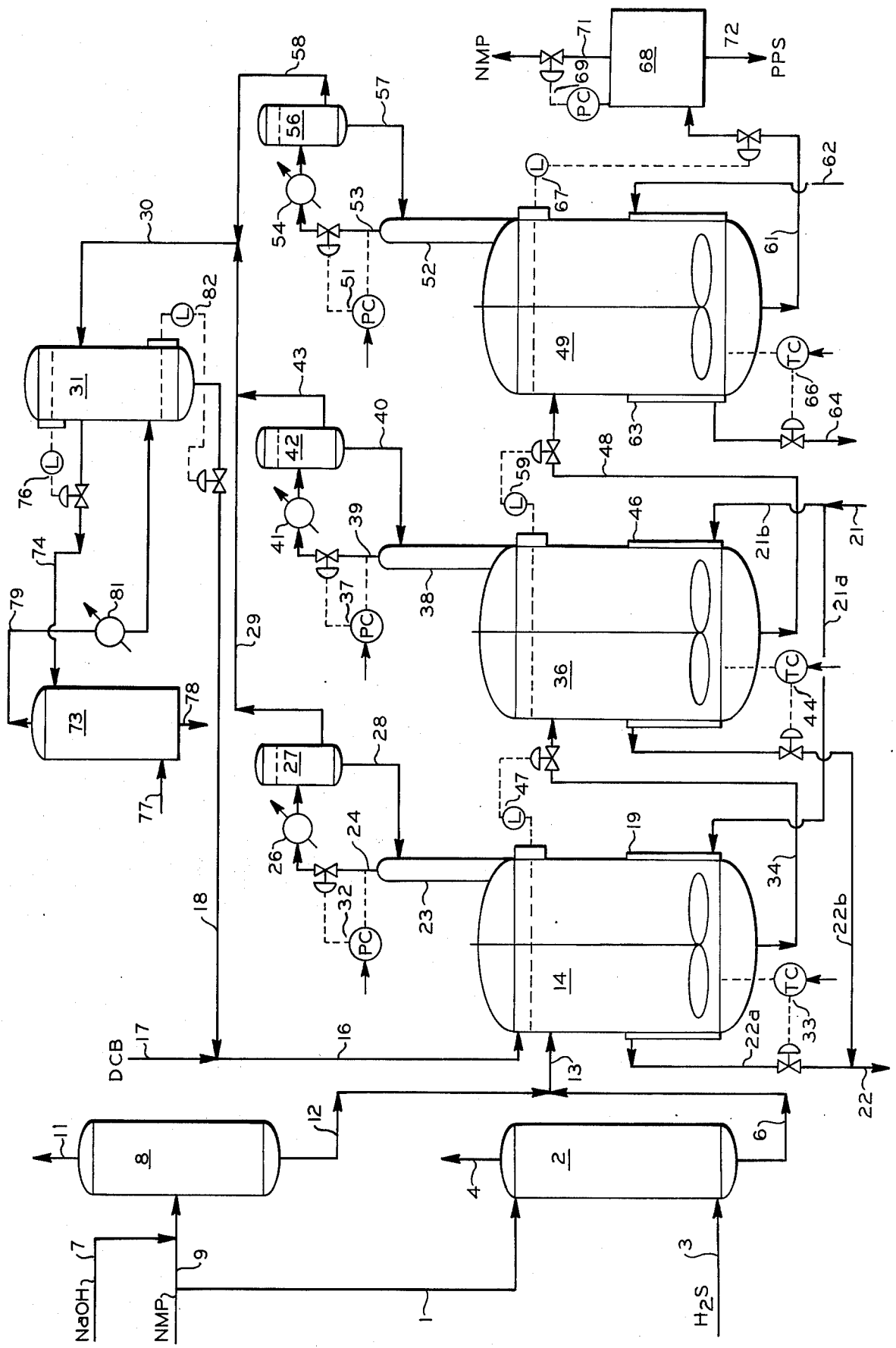

CONTINUOUS REACTION FOR PREPARATION OF ARYLENE SULFIDE POLYMER

BACKGROUND OF THE INVENTION

This invention is related to the production of arylene sulfide polymer. More particularly this invention is related to the production of phenylene sulfide polymer. In one of its aspects this invention is related to the continuous production of phenylene sulfide polymer. In another of its aspects this invention is related to the use of multiple reaction zones in series in the production of arylene sulfide polymer. In yet another of its aspects this invention is related to the continuous production of an arylene sulfide polymer by contacting, in the presence of an organic amide, a dihalo aromatic compound with a sulfur complex produced by contacting a solution of sodium N-methylamino butyrate in an organic amide with a solution of hydrogen sulfide in an organic amide, using multiple reaction zones in series, maintaining the reaction temperature in the several reactions relatively constant and using a seriatim reduction of pressure in the reaction zones to eliminate mechanical means for moving the reaction mixture to each subsequent reaction zone.

Processes for producing arylene sulfide polymers are well known as shown in U.S. Pat. No. 3,354,129 and copending application, Ser. No. 495,450, filed August 8, 1974 and now Pat. No. 3,919,177. Processes for the production of arylene sulfide polymer, or more specifically phenylene sulfide polymer, heretofore have generally been limited to batch operation. Up to now, a satisfactory method for the continuous operation of a process for producing arylene sulfide polymers had not been developed. An operative and economical method for continuous production of arylene sulfide polymers would be advantageous. In the continuous, multi-reaction-zone process set forth herein, efficiency and economic advantage are increased by the continuous formation of the sulfur source stream and by the elimination of pumping devices between the reaction zones by operating the reaction zones in series at seriatim decreased pressures.

It is an object of this invention to provide a method for the continuous production of arylene sulfide polymer. It is another object of this invention to provide a multiple reaction zone process for the production of arylene sulfide polymer. It is still another object of this invention to provide a multiple reaction zone process for the production of arylene sulfide polymer in which the pressure of the reaction zones is regulated to provide flow from one reaction zone to the next without the use of mechanical means of transfer between the reaction zones.

Other aspects, concepts, objects, and the various advantages of this invention will be apparent from the study of this disclosure, the drawing, and the appended claims.

STATEMENT OF THE INVENTION

According to the present invention there is provided a continuous process for production of arylene sulfide polymers using a plurality of reaction vessels connected in series in which the reactant compounds — a dihalo aromatic compound, and a sulfur source comprising a sulfur complex produced by the continuous contacting of sodium N-methylamino butyrate with a solution of hydrogen sulfide in organic amide — are introduced into a first reaction zone maintained at polymerization conditions in which the controlled temperature and pressure are sufficient to remove a portion of the water released therein, the organic amide serving as the diluent for the reaction mixture. The polymerization mixture is then moved through one or more additional reaction zones in series in which the pressures decrease successively. The reaction mixture is maintained throughout the succession of reaction zones at about the same temperature level. The reaction mixture is retained within the series of reactors for a time sufficient substantially to complete the polymerization reaction. The invention also provides a continuous process for the formation of sodium N-methylamino butyrate and a solution of hydrogen sulfide in an organic amide and contacting these to produce the sulfur source useful in the polymerization.

In a preferred embodiment of the invention, the effluent from the last (third) reaction zone is passed into a zone wherein the pressure is reduced sufficiently to cause flash evaporation of the majority of the liquid material remaining in the effluent so that a solid particulate product comprising arylene sulfide polymer and solid impurities and a condensible vapor, comprising diluent, reactants and water liberated from the sulfur source and feed streams are recovered. The condensible vapor can be condensed, separated, and at least a portion thereof recycled to the reaction process.

In general, the reaction conditions suitable for the process of this invention will fall within a temperature range of about 235° C to about 285° C. Each of the reaction zones in the series will be maintained within this range with as little variation from a preferred temperature, such as 260° C, as is possible.

In order to cause the flow of reactants from one reaction vessel to the next in the series it has been found that suitable ranges of reaction pressures are, for the first reaction zone in the series, in the range of about 13.5 to about 15.5 Kg/cm$^2$; for the second reaction vessel, in the range of about 12.0 to about 13.5 Kg/cm$^2$; and for the third reaction vessel, in the range of about 10.5 to about 12.0 Kg/cm$^2$. Each reaction zone pressure is maintained within the respective ranges to obtain sufficient differential pressure between the vessels to cause flow from a higher pressure vessel to a lower pressure vessel.

It has been found that operation of the reaction zones at essentially the same temperature and within these pressure ranges requires a net transfer of heat from the polymerization reaction in the first two reaction zones in the series and requires a flow of heat into the third reaction zone. The reactant materials are retained within the series of reaction vessels for a time sufficient substantially to complete the polymerization. Maintaining the reaction zones at desired temperatures within the prescribed temperature ranges at the pressures set forth above causes the evaporation of a substantial amount of water and small amounts of the organic amide and the dihalo aromatic compound in each of the reaction zones. The evaporation of these liquids produces the lower vapor pressures in the downstream reactors. This difference in pressure is the driving force that causes flow through the reaction zones.

The invention can best be understood in conjunction with the drawing which is a schematic representation of a continuous reaction system containing (1) means for producing a sulfur complex, (2) three separate reaction zones connected in series, and (3) a vessel or vessels for the flash evaporation of liquids, principally diluent, from the reaction mixture to produce a particulate polymerization product. The drawing will be described in conjunction with a particular embodiment of the invention in which specific reactants and reaction conditions are used. This example should be taken as illustrative and not restrictive to the scope of the invention.

Referring now to the drawing, N-methyl-2-pyrrolidone (NMP) from line 1 is contacted as absorbent in vessel 2 with a hydrogen sulfide-carbon dioxide stream supplied through line 3 in a countercurrent absorption process. A less concentrated hydrogen sulfide ($H_2S$) stream, not absorbed in column 2, is removed therefrom through line 4. NMP containing $H_2S$ absorbed therein is transferred from vessel 2 through line 6. A 50 weight percent aqueous solution of sodium hydroxide (NaOH) is transferred through line 7 to mix with NMP fed to distillation column 8 through line 9. In column 8 the NaOH and a portion of the NMP react to form a solution of sodium N-methylamino butyrate (SMAB) in NMP accompanied by dehydration, water being removed as steam by line 11. The SMAB solution is transferred through line 12 to mix with the $H_2S$ in NMP solution from line 6 thereby forming in line 13 a sulfur source which may be described as an NMP-$Na_2S$-$H_2O$ complex which is fed to first reaction zone 14.

Also fed to reactor 14 is a p-dichlorobenzene (DCB) stream 16 which is comprised of fresh DCB from line 17 and recycle DCB from line 18, to be described later. Zone 14 is maintained at conditions of about 260° C and 14.6 Kg/cm² absolute pressure. At these conditions, DCB and $Na_2S$ complex react to form poly(phenylene sulfide), the polymerization being strongly exothermic and producing heat, a portion of which is removed by evaporation of water and small amounts of DCB and/or NMP. The balance of the heat of reaction is removed by oil circulated through reactor jacket 19, the oil being received from source 21 and discharging to 22 for cooling and recirculation. Evaporated reaction liquid, principally water, is removed from the top of the reactor through small fractionator 23, line 24, condenser 26, the resulting liquid entering accumulator 27. A portion of the water-rich liquid plus all the heavy (DCB) phase is returned to the fractionator as reflux by line 28, the balance being transferred by lines 29 and 30 to phase separator-feed tank 31 to be described later. Pressure control assembly 32 comprising conventional pressure sensing, controlling and regulating means serves to maintain the desired (setpoint) pressure of 14.6 Kg/cm² within reactor 14. Temperature control assembly 33 functions to regulate the flow rate of cooling oil from supply line 21a through jacket 19 exiting by line 22a so as to maintain the desired (setpoint) temperature of 260° C in stirred reactor 14.

Flow of effluent reaction slurry comprising diluent, polymer and reactants through line 34 is induced from first reaction zone 14 into second reaction zone 36 by the difference in pressure between the vessels created by the operation of pressure control assembly 37 in maintaining the reaction pressure in vessel 36 at a desired (setpoint) value of 13.2 Kg/cm², again by regulating the flow rate of vapor (principally steam) through small fractionator 38, line 39, condenser 41, accumulating the resulting liquid in tank 42, of which a portion is refluxed to fractionator 38 via line 40, the balance being transferred to tank 31 by lines 43 and 30. This controlled difference in pressure from the preceding reactor is sufficient to cause adequate flow from vessel 14 to vessel 36, the liquid level in 14 being maintained by the operation of control assembly 47. Similarly to first reactor 14, second reaction zone 36 is maintained at a temperature of about 260° C by temperature control assembly 44 regulating cooling oil flow via line 21b, jacket 46 and line 22b. Generally a lesser amount of heat is removed from reactor 36 than from reactor 14.

Flow is induced through line 48 from second reaction zone 36 to third reaction zone 49 by the pressure differential between the vessels created by the operation of pressure control assembly 51 in maintaining the reaction pressure in vessel 49 at a desired (setpoint) value of 11.3 Kg/cm², again by regulating the flow rate of vapor (principally steam) through small fractionator 52, line 53, condenser 54, accumulating the resulting liquid in tank 56, of which a portion is refluxed to fractionator 52 via line 57, the balance being transferred to tank 31 by lines 58 and 30. This controlled difference in pressure from the preceding reactor is sufficient to cause adequate flow of reaction slurry, principally diluent NMP, particulate polymer (PPS), salt (NaCl) and some water, from vessel 36 to vessel 49, the liquid level in 36 being maintained by the operation of control assembly 59. In third reaction zone 49, the polymerization reaction is substantially complete so that some heat must be supplied by hot oil stream 62 passing through jacket 63 and exiting by line 64 regulated by temperature control assembly 66 to maintain a desired (setpoint) temperature of 260° C to finish the polymerization reaction and to provide heat for evaporation of water (line 53) and thermal losses.

Flow is induced through line 61 as regulated by liquid level control assembly 67 from reaction zone 49 into flash evaporation and polymer drying zone 68, which preferably comprises at least two stages, a and b, of vaporization recovery of diluent NMP and other volatiles (line 71) from polymer product and salt by-product under reduced pressure such as regulated (schematically) by pressure control assembly 68 to maintain flash stage pressures of about 9.2 and 1.3 Kg/cm² to assist these known diluent recovery processing and recycle operations, not shown. Additional heat and superheated steam are supplied to zone 68 as required, uncondensed steam exiting with the stripped volatiles in line 71. Solid, particulate poly(phenylene sulfide) product containing a substantial concentration of by-product salt (NaCl) is recovered for further processing through conduit 72.

Evaporated liquid streams (principally water) resulting from pressure regulation of reaction zones 14, 36, and 49 are collected into line 30 and are processed for recovery of minor concentrations of DCB and/or NMP contained therein by steam distillation and liquid-liquid phase separation from the major component, water. Stream 30 is fed to settling tank 31 from which the lower density water phase is fed to column 73 via line 74 under regulation by liquid level control assembly 76. Live steam fed to column 73 by line 77 distills the DCB and NMP from the bulk of the water which is removed by line 78. The overhead vapors, line 79, are condensed in cooler 81 and returned to settling vessel 31 for liquid phase separation of the heavier organics phase (DCB and NMP) from the water, the recovered organics being returned to the polymerization process by line 18 under regulation by liquid level control assembly 82.

Auxiliary process equipment, such as heating means for vessel 8 and cooling means for vessel 2, feed pumping means thereto and therefrom and that associated with vessels 31 and 73 and DCB feed line 17 as well as miscellaneous control systems all of which are conventional in commercial polymerization processes but form no part of this invention, have not been shown in the interests of brevity.

Exemplary processing conditions are given as follows, referring to the drawing and description of the drawing:

| Stream | Vessel | Temp. °C | Press. Kg/cm² abs. |
|---|---|---|---|
| 1 | | 40 | |
| | 2 | 40 | 16.5 |
| 3 | | 38 | |
| 7 | | 40 | |
| | 8 | 216 | 1.3 |
| | 14 | 260 | 14.6 |
| 21 | | 204 | |
| 22 | | 232 | |
| 30 | | 82 | |
| | 31 | 82 | 1.4 |
| | 36 | 260 | 13.2 |
| | 49 | 260 | 11.3 |
| 62 | | 316 | |
| 64 | | 288 | |
| | 68a, b | 282, 233 | 9.2, 1.3 |
| | 73 | 142 | 1.4 | amounts of organic amide and dihalo aromatic compound, maintaining the reaction mixture in said first reaction zone for a time sufficient to permit partial polymerization; and b. passing the partially polymerized reaction mixture into at least one further reaction zone maintained at polymerization conditions in the same temperature range as the first reaction zone but at a lower pressure than said first reaction zone, the pressure of said second zone within the range of about 12.0 Kg/cm² to about 13.5 Kg/cm², for a time sufficient further to polymerize said reaction mixture and further to evaporate water and organic amide, substantially completing the polymerization reaction therein.

2. A process of claim 1 wherein the substantially completely polymerized reaction mixture is flash evaporated to produce a particulate, solid product by vaporizing liquid therefrom.

3. A process of claim 1 utilizing three reaction zones further comprising passing the partially polymerized reaction mixture into a second reaction zone maintained at polymerization conditions in the same temperature A simplified material balance for this continuous flow polymerization process, again referring to the drawing and discussion of the drawing for stream numbers, is given below in terms of Kilograms per hour flow rate.

| Component | Stream Number | | | | | | | | | | | | | | | |
|---|---|---|---|---|---|---|---|---|---|---|---|---|---|---|---|---|
| | 1 | 3 | 6 | 7 | 9 | 12 | 13 | 16 | 17 | 18 | 29 | 34 | 43 | 48 | 58 | 61 | 71* | 72 |
| NMP | 1425 | | 1425 | | 3324 | 934 | 3562 | 1 | | 1 | | 4511 | | 4750 | 1 | 4749 | 4749 | |
| H₂S | | 454 | 408 | | | | | | | | | | | | | | | |
| CO₂ | | 39 | 3 | | | | | | | | | | | | | | | |
| NaOH | | | | | 966 | | 2 | | | | | 2 | | 2 | | 2 | | 2 |
| H₂O | | | | | 966 | | 219 | | | | 134 | 261 | 59 | 242 | 59 | 183 | 183 | |
| Butyrate | | | | | | 3358 | | | | | | | | | | | | |
| S Complex | | | | | | | 2337 | | | | | 467 | | | | | | |
| DCB | | | | | | | | 1781 | 1779 | 2 | 1 | 370 | 1 | 18 | | 18 | 18 | |
| PPS | | | | | | | | | | | | 1036 | | 1295 | | 1295 | | 1295 |
| NaCl | | | | | | | | | | | | 1120 | | 1400 | | 1400 | | 1400 |
| Na₂CO₃ | | | | | | | 8 | | | | | 8 | | 8 | | 8 | | 8 |
| TOTALS | 1425 | 493 | 1836 | 1932 | 3324 | 4292 | 6128 | 1782 | 1779 | 3 | 135 | 7775 | 60 | 7715 | 60 | 7655 | 4950 | 2705 |

*Stripping steam not included.

As can be seen from the calculated example above, the continuous process for preparing arylene sulfide polymer set forth in this specification provides an effective and economical method for polymerization efficiently using a minimum investment in operating equipment.

I claim:

1. A continuous process for producing particulate arylene sulfide polymer by contacting, at reaction conditions, a reaction mixture comprising (1) an organic amide, (2) a dihalo aromatic compound and (3) a sulfur complex produced by contacting sodium N-methylamino butyrate with an organic amide in which $H_2S$ is absorbed, said process comprising:

a. introducing said reaction mixture into a first reaction zone maintained at polymerization conditions at a pressure within the range of about 13.5 Kg/cm² to about 15.0 Kg/cm² and within a temperature range sufficient to evaporate water and small range as the first reaction zone but within a lower pressure range than said first reaction zone for a time sufficient further to polymerize said reaction mixture and further to evaporate water and organic amide, passing the further polymerized reaction mixture into a third reaction zone maintained at polymerization conditions in the same temperature range as the first reaction zone but at a lower pressure than the second reaction zone, the pressure of said third zone within the range of about 10.5 Kg/cm² to about 12.0 Kg/cm², for a time sufficient substantially to complete the polymerization reaction.

4. The process of claim 1 wherein the temperature in each reaction zone is within the range of about 235° C to about 285° C.

5. The process of claim 1 wherein each reaction zone is agitated.

6. The method of claim 1 wherein the organic amide is N-methyl-2-pyrrolidone.

* * * * *